(12) United States Patent
Suzuki et al.

(10) Patent No.: US 6,276,479 B1
(45) Date of Patent: Aug. 21, 2001

(54) DRIVE ARRANGEMENT FOR ELECTRIC POWER ASSISTED BICYCLE

(75) Inventors: Masahiro Suzuki; Hisatoshi Akita; Nozomu Takata, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 08/595,449

(22) Filed: Feb. 5, 1996

Related U.S. Application Data

(63) Continuation of application No. 08/279,337, filed on Jul. 22, 1994, now abandoned.

(30) Foreign Application Priority Data

Jul. 26, 1993 (JP) .................................................. 5-202542

(51) Int. Cl.[7] .................................................. B62M 23/02
(52) U.S. Cl. .......................... 180/207; 180/220; 180/68.5
(58) Field of Search ..................................... 180/206, 220, 180/207, 205, 65.2, 68.5; 280/212, 215

(56) References Cited

U.S. PATENT DOCUMENTS

| | | | |
|---|---|---|---|
| 3,773,131 | * 11/1973 | Jaulmes | 180/206 |
| 3,884,317 | * 5/1975 | Kinzel | 180/205 X |
| 4,085,814 | * 4/1978 | Davidson et al. | 180/206 |
| 4,168,758 | * 9/1979 | Holt | 180/206 |
| 4,406,342 | * 9/1983 | Lacroix | 180/220 |
| 4,410,060 | * 10/1983 | Cunard | 180/205 |
| 4,637,274 | * 1/1987 | Goldenfeld | 180/205 X |
| 5,242,028 | * 9/1993 | Murphy et al. | 180/205 X |
| 5,603,388 | * 2/1997 | Yaguchi | 180/220 X |

FOREIGN PATENT DOCUMENTS

| | | | |
|---|---|---|---|
| 103329 | * 2/1924 | (CH) | 362/72 |
| 0517224 | 12/1992 | (EP) . | |
| 658966 | 10/1951 | (GB) . | |
| 2050270 | 1/1981 | (GB) . | |
| 2083423 | 3/1982 | (GB) . | |
| 4244496 | * 9/1992 | (JP) | 180/206 |
| 5-238461 | * 9/1993 | (JP) | 180/220 |
| 5-278670 | * 10/1993 | (JP) | 180/220 |

* cited by examiner

Primary Examiner—Anne Marie Boehler
(74) Attorney, Agent, or Firm—Ernest A. Beutler

(57) ABSTRACT

A drive arrangement for an electrically power assisted bicycle, wherein the electrical power assist components are comprised of an electric motor and transmission as one unit and a battery as another unit, with the electric motor and transmission being disposed on one side of and relatively low relative to a manual crank axis and the battery case is disposed on the rear side of the crank axis to improve fore and aft balance while maintaining a low center of gravity.

17 Claims, 10 Drawing Sheets

DRIVE ARRANGEMENT FOR ELECTRIC POWER ASSISTED BICYCLE

This application is a continuation of U.S. patent application Ser. No. 08/279,337, filed Jul. 22, 1994, now abandoned.

BACKGROUND OF THE INVENTION

This invention relates to an electrically power assisted bicycle and more particularly to an improved bicycle of this type, the positioning of the driving components therefore, and an improved arrangement for facilitating battery servicing.

Electrically power assisted bicycles of the type shown in U.S. Pat. No. 5,266,501, issued Jul. 13, 1993 and copending applications, Ser. Nos. 08/026,868 filed Mar. 5, 1993, now issued as U.S. Pat. No. 5,375,676 on Dec. 27, 1994; 08/059,540 filed Mar. 10, 1993, now issued as U.S. Pat. No. 5,370,200 on Dec. 6, 1994 and 08/128,799 filed Sep. 29, 1993, now issued as U.S. Pat. No. 5,474,148 on Dec. 12, 1995 all of which are assigned to the assignee hereof, have a number of advantages. In the construction shown in each of those applications and the aforenoted patent, the bicycle is provided with a conventional pedal mechanism operated by the rider.

In addition, there is provided an electric motor powered by a battery and controller arrangement for assisting the operator effort in response to the pedal input force so as to make the riding of the bicycle easier while at the same time maintaining its ability to provide exercise for the rider. In the arrangements shown in those applications, the motor and its driving transmission are disposed in a generally vertically orientation either aligned with or beneath the seat pillar. The battery and controller are disposed in a somewhat horizontally extending position along the main frame member that extends from the head pipe downwardly toward the pedal mechanism. Although this arrangement has a number of advantages, it tends to move the center of gravity of the bicycle generally forwardly of the crank mechanism and also somewhat elevates the center of gravity. Of course, by positioning these mechanisms below the crank axis, the aforenoted problems could be avoided but this would then substantially restrict the ground clearance for the bicycle.

It is, therefore, a principal object to this invention to provide an improved layout for the electrical power assist components of an electrically power assisted bicycle so as to improve the balance and maintain a practical but low center of gravity.

One way in which the aforenoted objects may be met is by positioning a battery case behind or adjacent the seat pillar and positioning the battery or batteries in this case. However, this type of arrangement can make it more difficult to access the batteries for service.

It is, therefore, a still further object to this invention to provide an improved battery carrying arrangement for an electrical power assisted bicycle wherein the batteries are positioned so that they can be easily serviced.

It is a further object to this invention to provide an improved movable seat arrangement for an electrically assisted bicycle so as to facilitate servicing of the components of the bicycle.

SUMMARY OF THE INVENTION

A first feature of the invention is adapted to be embodied in an electrically power assisted bicycle that is comprised of a frame and a front wheel dirigibly supported by the frame. A rear wheel is journalled for rotation by the frame and a seat is carried by the frame for accommodating a rider. A pedal assembly is journalled by the frame for rotation about a transverse crank axis for operation by a rider. A drive couples the pedal assembly to the rear wheel for manual driving of the rear wheel. An electric power assist mechanism is provided for transmitting a driving force to the rear wheel through the drive and comprises an electric motor disposed on one longitudinal side of the crank axis and an electrical battery for providing electrical power to the electrical motor and which is disposed on the other longitudinal side of the crank axis.

Another feature of the invention is adapted to be embodied in an electrically powered bicycle that is comprised of a frame assembly and a front wheel dirigibly supported by the frame assembly. A rear wheel is journalled for rotation by the frame assembly. The frame assembly is comprised of an upstanding seat post carrying a seat at the top thereof for accommodating a rider. An electric motor is carried by the frame assembly for powering the rear wheel and a battery case is carried by the frame assembly to the rear of the seat post for accommodating a battery for powering the electrical motor. The battery case is disposed beneath the seat and the seat is moveable relative to the seat post for accessing the battery case for battery removal.

DETAILED DESCRIPTION OF THE PREFERRED EMBODIMENTS OF THE INVENTION

Figure 1:
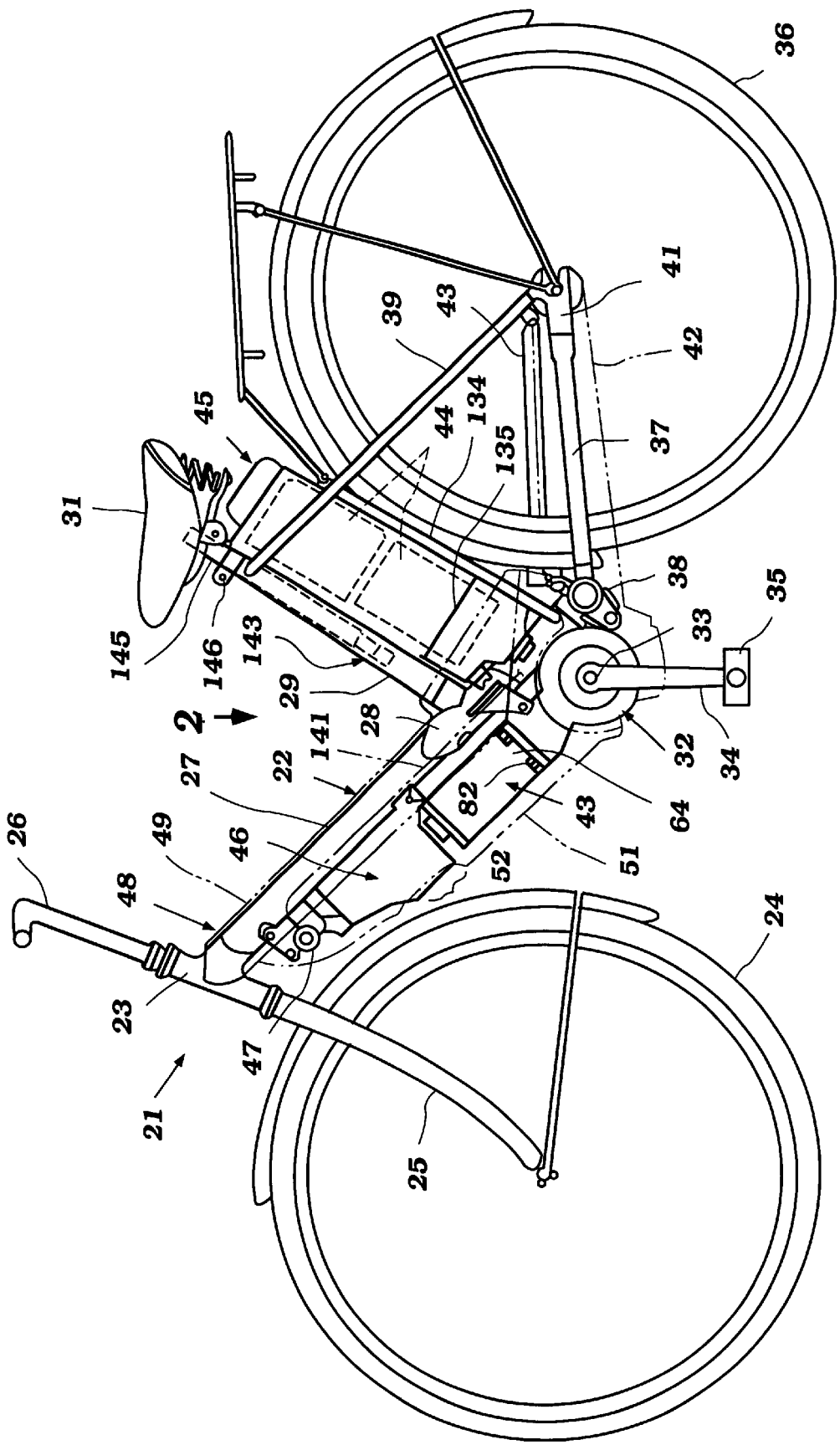
FIG. 1 is a side elevational view of an electric motor assisted bicycle constructed in accordance with an embodiment of the invention.
Figure 2:
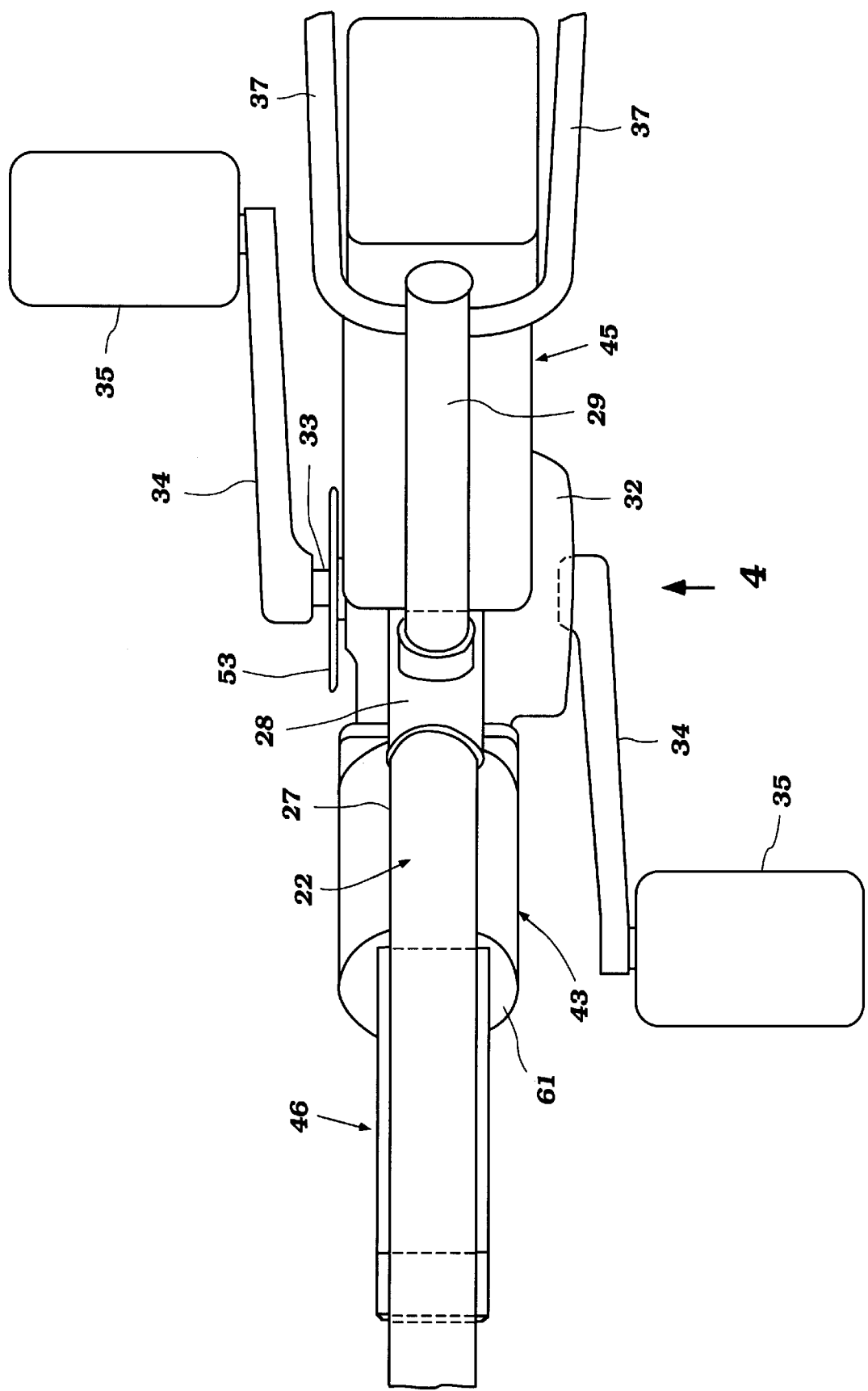
FIG. 2 is an enlarged top plan view looking generally in the direction of the arrow 2 in FIG. 1 and shows the relationship of the pedal mechanism, the driving electric motor and transmission, and the battery case.

Referring now in detail to the drawings and initially primarily to FIGS. 1 and 2, an electric power assisted bicycle constructed in accordance with an embodiment of this invention is identified generally by the reference numeral 21. The bicycle 21 is comprised of a frame assembly, indicated generally by the reference numeral 22, which is comprised of a head pipe 23 that dirigibly journals a front wheel 24 by means of a fork assembly 25. A handlebar 26 is affixed to the upper end of the fork assembly 25 in a well known manner for steering of the front wheel 24.

The frame assembly 22 further includes a downwardly inclined main frame tube 27 that extends rearwardly and downwardly from the head pipe 23 and which terminates at its lower end in a connecting piece 28. The connecting piece 28 has affixed to it a seat pillar 29 upon which a saddle-type seat 31 is connected in a manner which will be described.

The connecting piece 28 is also connected to the upper end of a transmission and pedal support case 32 which journals a crankshaft 33 in a manner which will be described from which a pair of crank arms 34 extend on opposite sides of the case 32. Pedals 35 are journalled at the outer ends of the crank arms 34 in a known manner. The axis of rotation of the crankshaft 33 is disposed generally transversely of the frame assembly 22.

A rear wheel 36 is journalled for rotation from the frame assembly 22 by means of a rear arm 37 that is connected to a bracket 38 which is suitably affixed to the case 32 and a pair of back stays 39 which extend from the flattened ends 41 of the rear arm 37 and which are connected at their upper ends to the seat pillar 29.

The crank assembly and specifically the crankshaft 34 drives a sprocket, to be described, which in turn drives the rear wheel 36 through a chain 42. The chain 42 is encompassed by a chain guard 43 that is affixed to the frame assembly 27 and one of the back stays 39 at one side of the bicycle 21.

In addition to the manual drive for the rear wheel 36, the bicycle 21 is also provided with an electric power assist mechanism which includes an electric motor 43 which is mounted in a manner to be described beneath the main frame tube 27 and thus maintains a low center of gravity. The electric motor 43 receives electrical power from a pair of batteries 44 that are contained within a battery case 45 that is mounted, in a manner to be described, to the rear of and extending parallel to the seat pillar 29. The seat 31 is movable, in a manner which will be described, so as to access the batteries 44 for replacement and/or service.

The batteries 44 supply power to the electric motor 43 through a controller, indicated generally by the reference numeral 46, and which is mounted on the underside of the main frame tube 27 forwardly and above the electric motor 43. The controller 46 is powered by the batteries 44 through a main switch 47 that is affixed to the underside of the main tube 27 adjacent the head pipe 23.

It should be readily apparent that the forward positioning of the electric motor 43 and controller 46 relative to the axis of the crankshaft 33 and the rearward positioning of the batteries 44 and battery case 45 relative to this axis provides substantially equal fore and aft balance so as to maintain the stability of the bicycle 21. Also, the components are mounted relatively low so as to maintain a low center of gravity while not being so low as to provide reduced ground clearance.

The electric motor 43 and controller 46 are enclosed partially within a case assembly 48 that is comprised of an upper member 49 and a lower member 51 which are affixed to each other in any known manner. These members are provided with an opening through which a portion of the controller 46 extends, as indicated by the bracket 52 in FIG. 1 so as to permit cooling air flow over components of the controller 46 which should be maintained at relatively low temperatures.

A sprocket 53 which is driven from either the crankshaft 33 or electric motor 43 in a manner to be described appears in FIG. 2 and drives the aforenoted chain 42 for driving the rear wheel 36. Before describing this driving mechanism in detail by reference to FIGS. 4 and 6–9, the driving system will be described by reference to FIG. 3 which shows the various components schematically. As may be seen in FIG. 3, the manual pedal power exerted by the operator seated on the seat 31 on the pedals 35 and crank arms 34 is transmitted through a one-way clutch, indicated schematically at 54 to the sprocket 53 and chain 42. The chain 42 is, in turn, drivably coupled to the rear wheel 36 by means of a freewheeling mechanism, shown schematically at 55, which may also comprise a one-way clutch.

In a similar manner, the electric motor 43 drives a planetary transmission or other speed-reducing transmission, shown schematically at 56, which in turn, also drives the sprocket 53 through a one-way clutch, indicated schematically at 57. The controller 46 operates the electric motor 43 in accordance with a system to provide power assist for driving the rear wheel 36 with the amount of power assist being determined, at least in part, by the force exerted by the operator on the pedals 35. The strategy described in any of the aforenoted copending applications, and also in the aforenoted issued patent, may be employed. Basically, this arrangement incorporates a speed sensor, indicated generally at 58 and shown in block form in this figure, and a torque sensor, indicated generally at 59, and also shown in block form. Because of the fact that the operator operates the mechanism through a pedal and crank mechanism, the actual torque output will vary depending upon the angular relationship of the crank arms 34 relative to the axis of the crankshaft 33, as is well known and is as described in the aforenoted copending applications.

Figure 5:
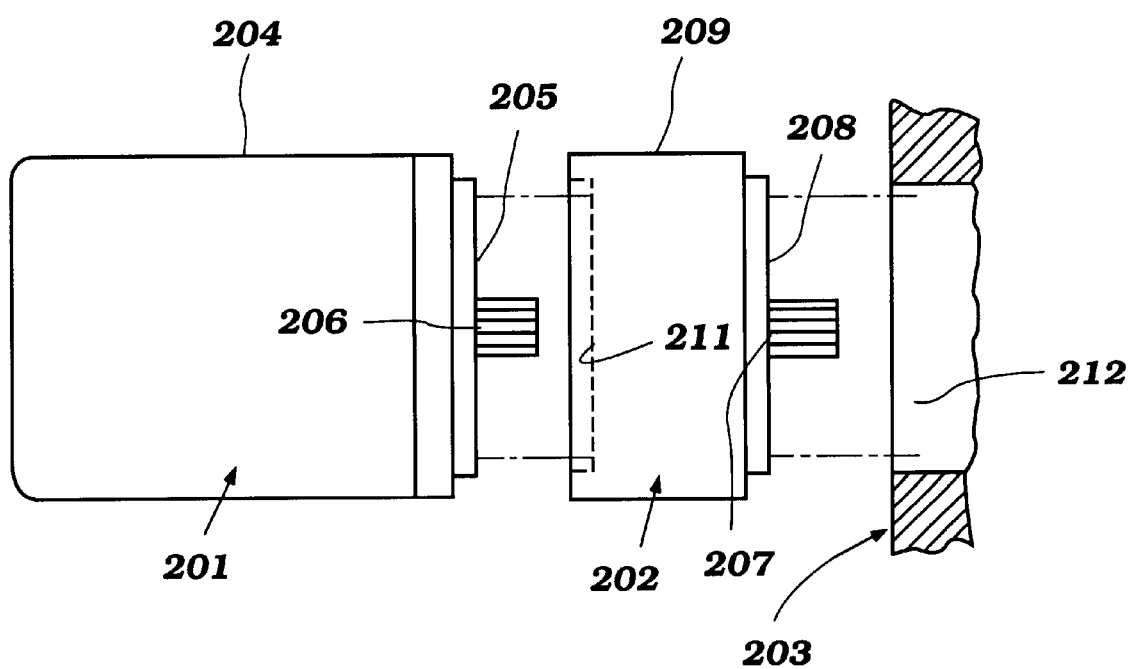
FIG. 5 is a partially exploded view showing the electric motor and transmission arrangement of the prior art type of construction.

Before describing the actual physical embodiment of the drive for the rear wheel 36, one of the problems attendant with certain types of prior art constructions will be described by particular reference to FIG. 5, which shows how an electric motor, indicated generally by the reference numeral 201, is coupled to a speed reducer transmission, indicated generally by the reference numeral 202, which is, in turn, then connected to an outer housing 203 of the driven element, such as the housing assembly 32 in this embodiment.

With the prior art type of constructions, the electric motor 201 is provided with an outer housing 204 having a front face 205 through which a splined output shaft 206 extends.

The output shaft 206 of the motor 201 is coupled to an input shaft (not shown) of the transmission 202 so as to drive an output shaft 207 that extends through a rear face 208 of its outer housing 209. The outer housing 209 is provided with a recess 211 into which the front face 205 of the electric motor 201 must be assembled. Hence, there is a problem of alignment of the motor shaft 206 with the transmission shaft, as well as of the housings 204 and 209.

Figure 4:
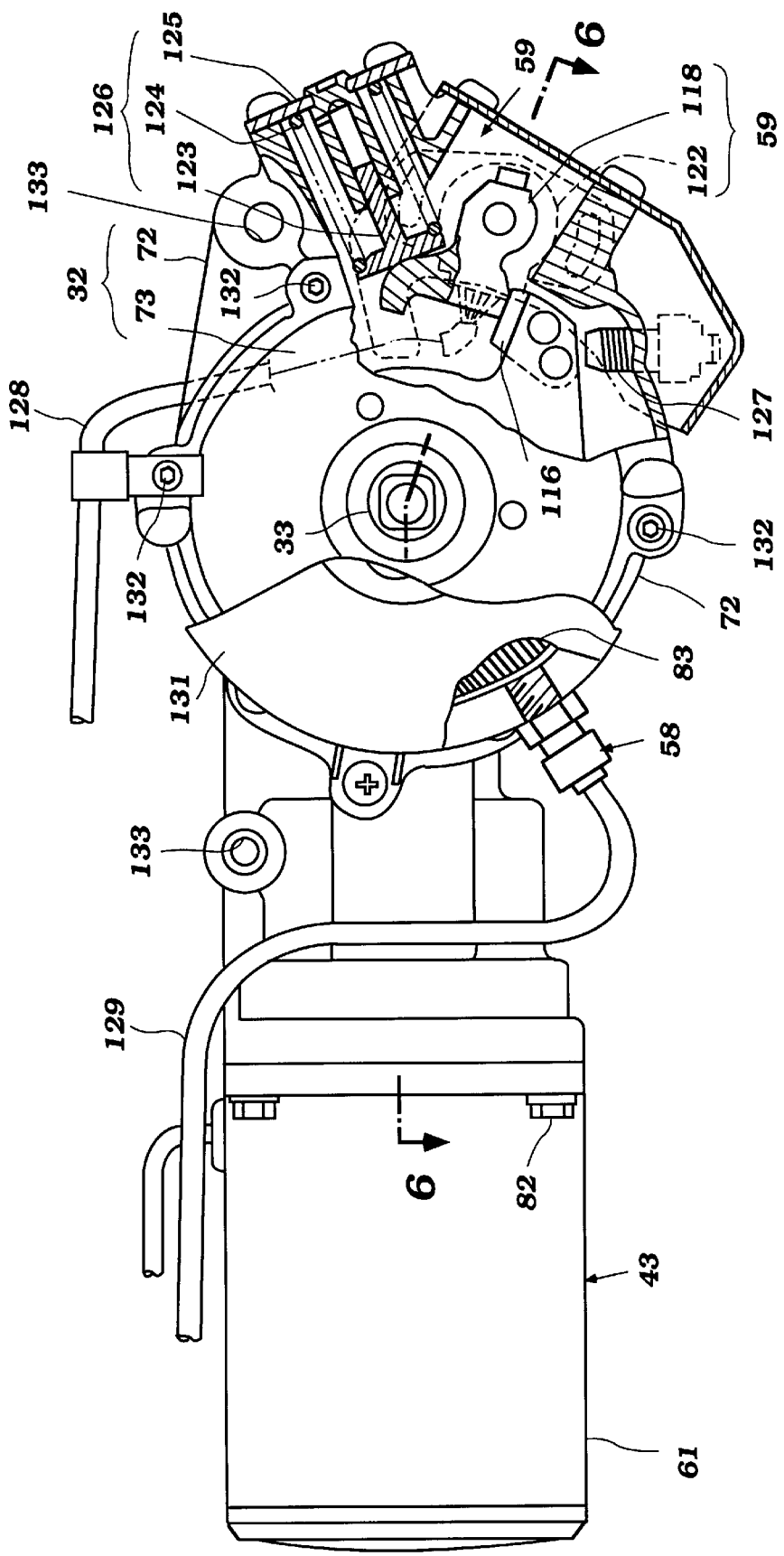
FIG. 4 is an enlarged side elevational view, looking generally in the direction of the arrow 4 in FIG. 2, with portions broken away so as to show the torque sensing mechanism and speed sensor.

In addition, the shaft 207 must be connected to a shaft (not shown) in the final drive housing 203, and the transmission housing 209 is received in a recess 212 of this housing. As a result, it should be seen that the construction of the prior art provides not only a rather elongated construction due to the assembly of several housings and components with each other, but also presents a problem of aligning a number of shafts and supporting housings with each other. One feature of the construction avoids this arrangement, and this will now be described in detail by particular reference to FIGS. 4, 6 and 8, wherein the electric motor 43 and its integral speed reduction transmission is shown in more detail. The motor 43 has an outer housing 61 which, in turn, has a rear face 62 through which the electric motor output shaft 63 extends. The transmission 56, shown schematically in FIG. 4, is illustrated in detail in FIGS. 6 and 8, and includes a plurality of planetary frictional elements 64 that are journalled on carrier shaft 65 by intermediate antifriction bearings 66. These planetary frictional elements 64 are held in tight frictional engagement with the outer periphery of the electric motor output shaft 63 upon assembly in a manner which will be described. As a result, there will be established a driving relationship between the motor shaft 63 and the planetary frictional elements 64.

The planetary frictional elements 64 are also engaged within a cylindrical interior of a fixed frictional orbit ring member 67 that has a pair of end plates 68 and which are affixed to the motor end face 62 by a plurality of threaded fasteners 71. It is to be understood in actual assembly the orbit element 67 and end plates 68 and 69 are affixed to the electric motor housing 61 before its assembly onto the remainder of the construction, which will be described.

The housing 32 is made up of a first member 72 to which a cover plate 73 is affixed. The housing member 72 has a generally cylindrical portion that encircles the orbit ring element 67 and also which encircles a carrier element 74 which has a plurality of bores 75 for receiving the carrier pins 65 on which the planetary elements 64 rotate. A ball-type thrust bearing 76 is loaded between the end of the motor output shaft 63 and the front face of the carrier 74 so as to provide axial alignment.

A pinion shaft 77 is rotatably journalled in the housing piece 72 by means of a pair of ball bearings 78 and engages a thrust bearing 79 which, in turn, engages the back face of the carrier 74. A one-way clutch 81 is interposed between the inner periphery of the carrier member 74 and the pinion shaft 77. The one-way clutch 81 is of a type which permits the insertion of the pinion shaft 77 into it in an axial direction without interference, but which, when assembled, permits the drive to be transmitted from the carrier member 74 to the pinion shaft, but does not permit the pinion shaft 77 to drive the carrier member 74. Any known type of one-way clutch may be employed, but one embodying roller-type clutching elements will permit the ease of assembly.

By using the frictional planetary transmission as thus far described, it is possible to ensure that the elements can be easily assembled and positioned. This can be done by first fixing the orbit number 67 and end plates 68 and 69 to the end of the motor housing 61 with the frictional planetary elements 64 positioned between them. The carrier pins 65 can then be inserted into the bearings 66 and frictional planetary elements 64 along with the supporting carriers 74. This is done after the assemblage comprised of the plates 68 and 69, orbit ring 67 and frictional planetary elements 64 are affixed to the motor housing 61 by threaded fasteners 71. This arrangement in essence forms a type of force fit. The outer surface of the motor output shaft 63 will thus form the location of the various elements relative to each other. Subsequently, the motor and thus assembled frictional planetary transmission 56 can be thus slipped over the pinion shaft 77 so as to complete the final assembly, and this assembly can be bolted together by means of bolts 82 (FIG. 4).

The area of the housing member 72 rearwardly of the portion where the carrier 74 and bearing 78 is positioned is provided with a further cavity that receives, among other things, the crankshaft 33 of the pedal assembly. This crankshaft is journalled for rotation within this cavity with the ends extending outwardly therefrom for connection to the crank arms 34 in a manner which will be described.

The pinion shaft 77 is formed with an integral pinion gear which meshes with a ring gear 83. The ring gear 83 is, in turn, affixed to a hub 84 that is journalled within the housing member 72 by means of a ball bearing assembly 85. The hub 84 is connected to the pinion gear 83 by means of fasteners or rivets 86. The sprocket 53 has a splined connection to the hub 84 by means of splines 87 so that when the ring gear 83 rotates, the sprocket 53 will be driven. One end of the crankshaft 33 is journalled within the hub 84 by means of anti-friction bearings 88 with an oil seal 89 being disposed at the outer periphery. The opposite end of the crankshaft 33 is rotatably journalled within the cover piece 73 of the housing assembly 32 by means of a further ball bearing assembly 91.

A planetary transmission, indicated generally by the reference numeral 92, is provided for establishing a driving relationship between the crankshaft 33 and the ring gear 83, and this connection also includes a one-way clutch. This one-way clutch is shown in most detail in FIG. 7, and in addition to acting as a one-way clutch, it provides a bearing arrangement for ensuring a coaxial relationship of the various elements of the one-way clutch and thus avoids the necessity of separate bearing elements to maintain the inner and outer races of the one-way clutch in their relationship.

Figure 10:
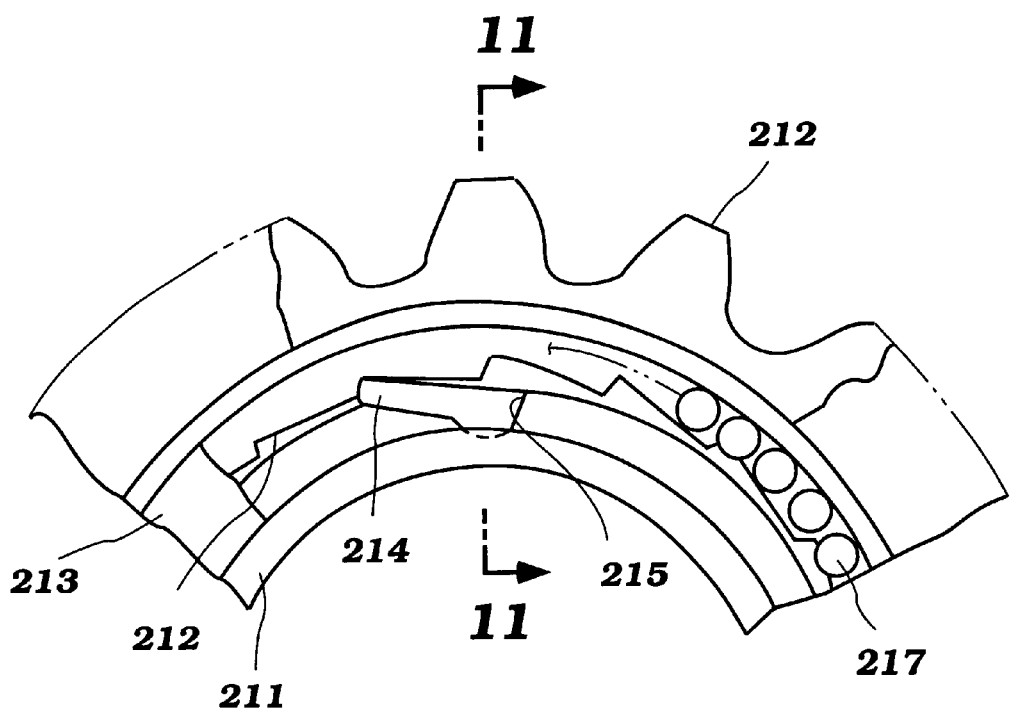
FIG. 10 is a partial side elevational view, in part similar to FIG. 7 and shows a prior art type of construction, with portions broken away.
Figure 11:
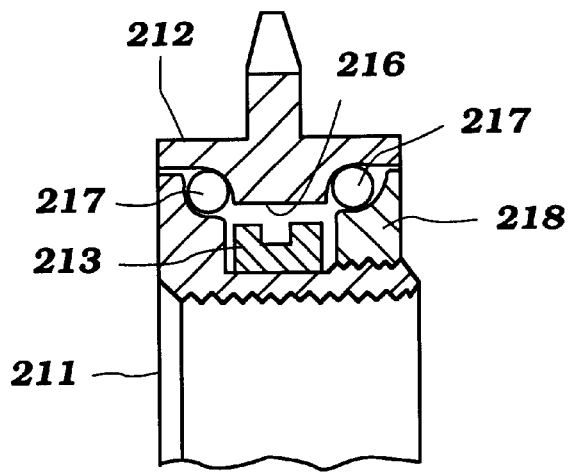
FIG. 11 is a cross-sectional view taken along the line 11—11 of FIG. 10.

Conventionally, the outer element was supported for rotation relative to the inner or driving element by means of roller or ball bearings and thus the bearings and associated pawl elements were all separate components that had to be assembled and added not only to the cost, but the size of the assembly. Such a prior art type of one-way clutch and bearing assembly is shown in FIGS. 10 and 11 wherein there is provided a driving connection between an inner hub 211 and an outer member such as a sprocket 212. The inner hub 211 has affixed for rotation with it an inner member 213 that pivotally supports a plurality of pawls 214 in pockets 215. These pawls 214 are normally biased outwardly by spring arrangement into receptive recesses 216 formed integrally within the interior of the sprocket 212 so as to establish a driving relationship in the counterclockwise direction as seen in FIG. 10 but to permit the sprocket 212 to overrun the hub 211 under some conditions.

Ball bearings 217 are interposed in races formed between the hub 211 and a threaded end piece 218 and in the sprocket 212. As a result, it is necessary to provide a complicated assembly arrangement for maintaining the desired relative rotational axes between the hub 211 and sprocket 212 which adds significantly to the cost and complexity of the assembly.

Because of the construction which will be described, it will be seen that the necessity for separate bearings is avoided with the one-way clutch mechanism, which is indicated generally by the reference numeral 93 in FIGS. 6 and 7. This one-way clutch assembly 93 includes a first or inner element 94 which is formed with female splines so as to receive male splines 95 of the crankshaft 33 so as to form a driving connection between the crankshaft 33 and the first element 94.

Figure 9:
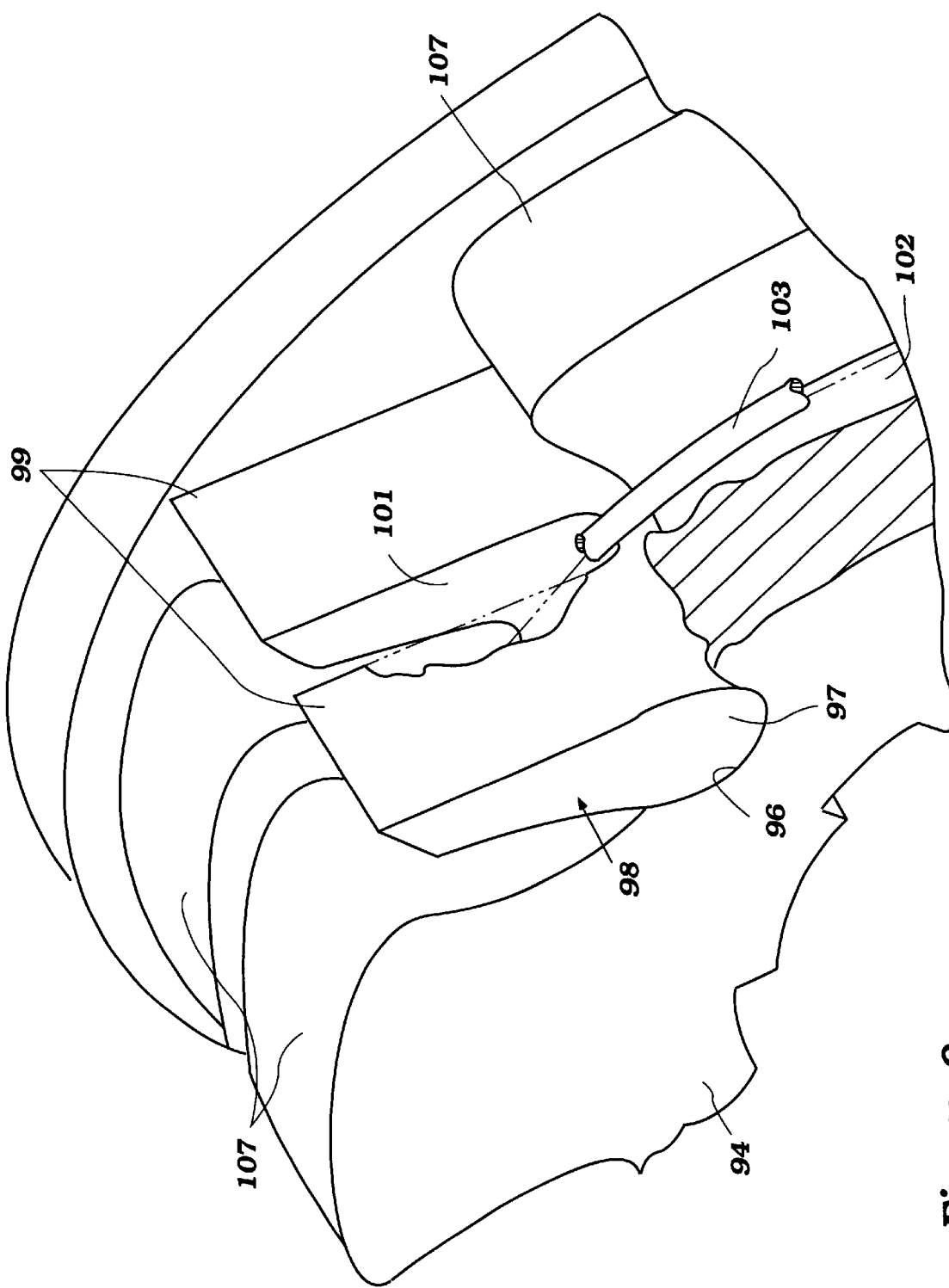
FIG. 9 is an enlarged perspective view, with a portion broken away, of the one-way clutch mechanism shown in FIG. 7.

The element 94 is provided with curved pockets 96 that receive the complementary curved cylindrical portions 97 of pawl elements, indicated generally by the reference numeral 98. These pawl elements 98 have bifurcated fingers 99 which are formed with slots 101 that are aligned with a corresponding slot 102 formed in the outer periphery of the element 94. A retainer spring element 103 is received in these slots 102 and 101 and retains the pawl elements 98 in their positions. The shape of the slots 101 is such that the spring 103 biases the pawls 98 to an engaged position as shown in FIGS. 7 and 9.

The one-way clutch 93 includes a second or outer member, indicated generally by the reference numeral 104, which is provided with a plurality of recesses 105 that are adapted to receive the pawls 98 and to form a driving relationship between the crank shaft 33 and the member 104. These pawl-receiving recesses 105 are formed, however, in such a way as to permit the member 104 to drive or rotate faster than the one-way clutch member 94 for a coasting operation or when pedaling backwards.

The area between the wedging recesses 105 defines a segmental cylindrical surface 106. This surface is engaged by a corresponding segmental cylindrical surface 107 formed by the member 94 by outstanding portions that extend beyond recesses formed by first and second portions 108 and 109 in which the pawls 98 are received on opposite sides of the sockets 96. Because of the extent of the cylindrical segments 107 and 106, there is always full bearing arrangement, albeit less than 360°, around the periphery of the elements 94 and 104. Thus the need for separate bearings for providing this relative support are avoided, and the overall construction is thus simplified.

Figure 6:
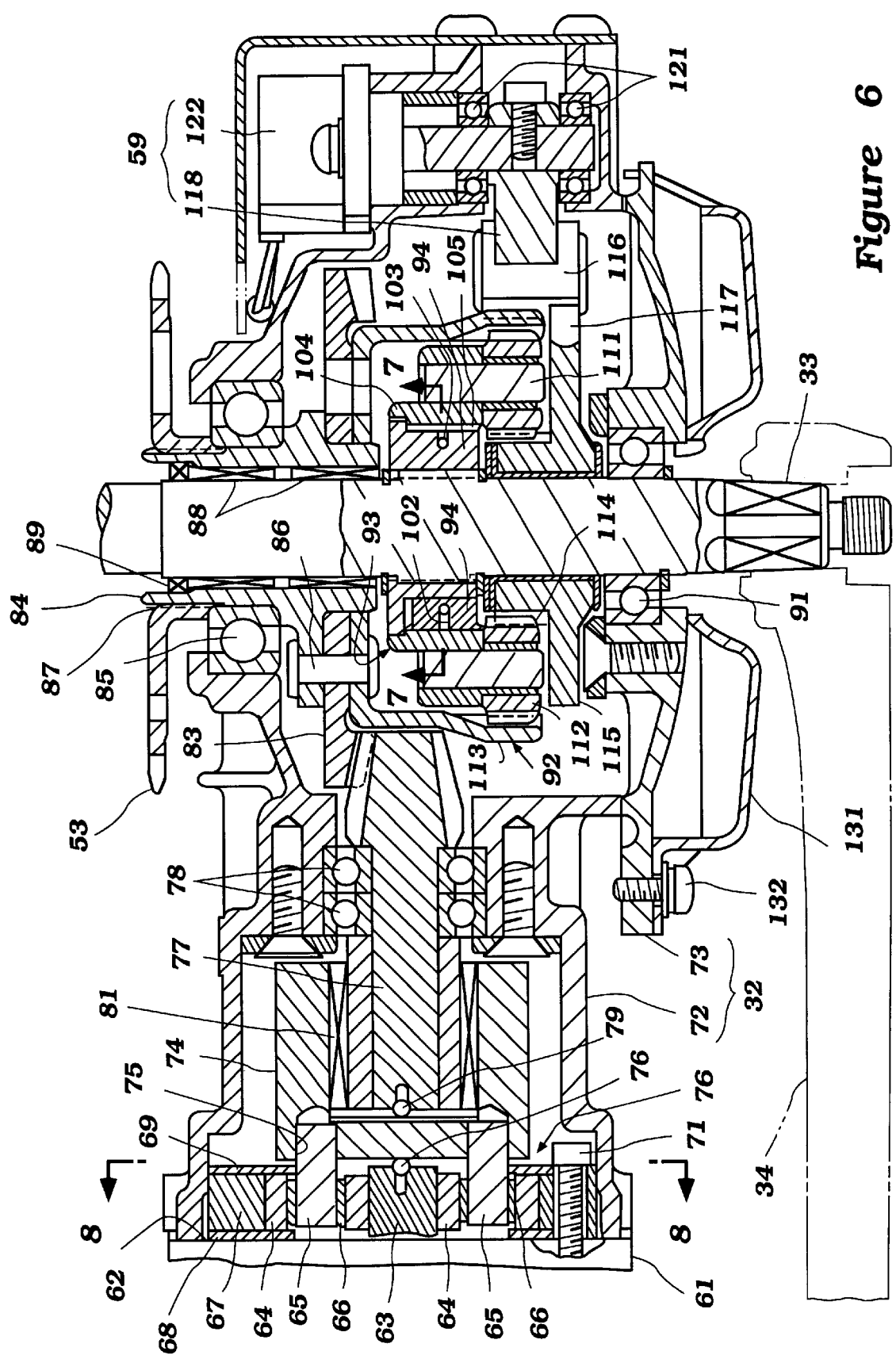
FIG. 6 is an enlarged cross-sectional view taken along the lines 6—6 of FIG. 4.
Figure 7:
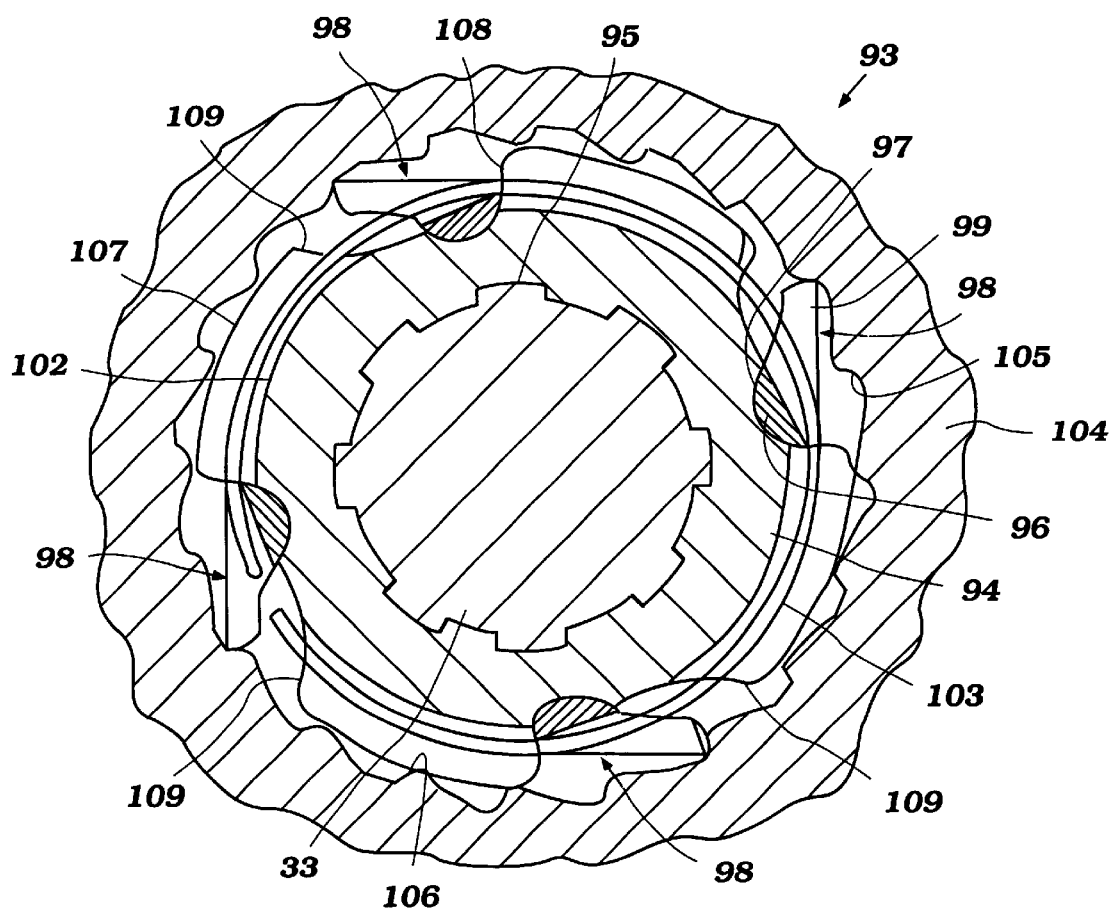
FIG. 7 is a further enlarged cross-sectional view taken along the lines 7—7 of FIG. 6.
Figure 8:
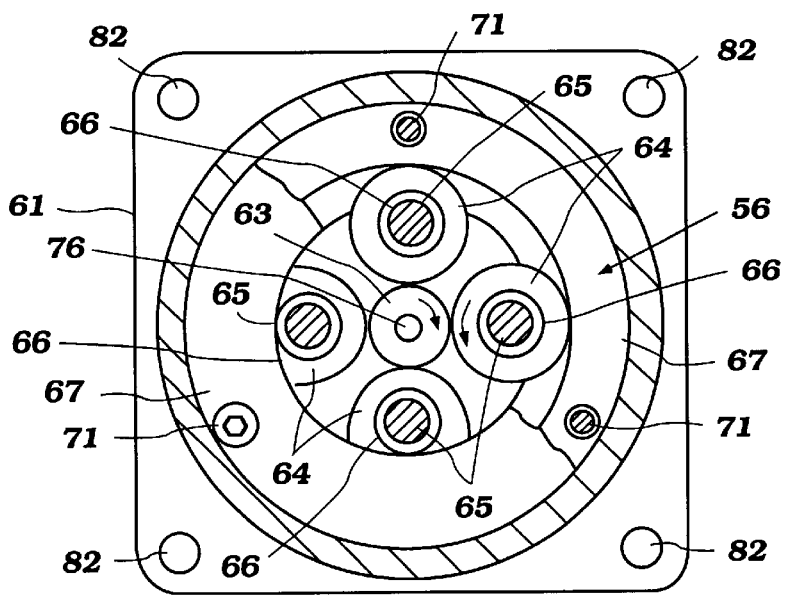
FIG. 8 is a cross-sectional view taken along the line 8—8 of FIG. 6.

As may be seen in FIG. 6, the outer one-way clutch element 104 carries a plurality of carrier pins 111 on which planet gears 112 are rotatably journalled. These planet gears 112 engage internal gears of a orbital member 113 which is fixed by the fasteners or rivets 86 for rotation with the ring gear 83.

It should be noted that the orbit member 113 has a larger diameter where its internal teeth are formed that are engaged with the planet gears 112 then adjacent the end of the pinion shaft 77 as clearly shown in this figure to maintain a relatively small outer diameter for the entire assembly so that the casing assembly 32 has a smaller diameter than that of the crank arms 34.

The planet gears 112 are engaged with a sun gear 114 formed by a flange 115 that is affixed axially to the crankshaft 33 but rotatable relative to it. As a result, the planetary transmission 92 formed by the sun gear 115, planet gears 112 and orbit ring gear 113, provide a speed reduction between the crankshaft 33 and the sprocket 53 upon pedal operation so as to provide a force amplification.

Figure 3:
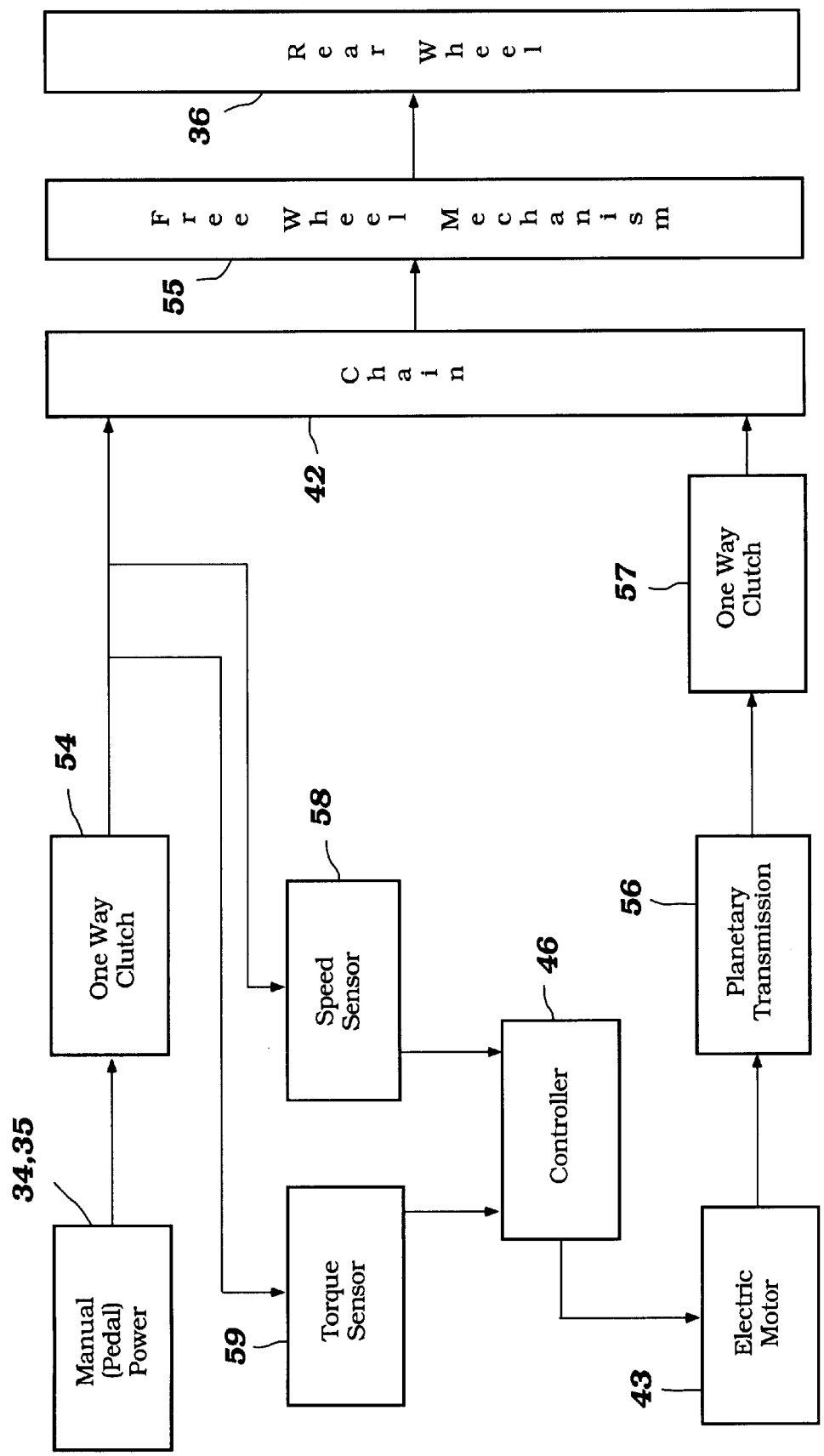
FIG. 3 is a schematic view showing the various elements of the drive for the rear wheel and the control therefor.

The sun gear 114 acts primarily as a part of the torque sensor previously indicated in block form in FIG. 3 and identified by the reference numeral 59 and identified by this same reference numeral in FIGS. 4 and 6. This torque sensor 59 includes an abutment element 116 that is affixed to a lug 117 formed on the flange 115. This abutment element 116 is engaged with a lever 118 that is affixed to a shaft 119 journalled in the housing member 72 on a pair of anti-friction bearings 121. The shaft 119 is connected to a wiper of a potentiometer 122 so as to provide an electrical output signal indicative of the degree of rotation of the sun gear 114 and, accordingly, the torque exerted by the operator on the pedal assembly.

A damper member 123 is engaged by a spring 124 which bears against a plate 125 so as to provide a biasing assembly 126 that acts to hold the lever 118 against rotation, and thus provides the torque measurement. An adjustable stop 127 limits the degree of rotation of the lever 118 and sun gear 114 in the clockwise direction as shown in FIG. 4. This type of torque sensor is described also in the aforenoted copending applications.

An electrical conduit 128 conveys the signal from the torque sensor 59 and specifically the potentiometer 122 to the controller 47.

The speed sensor 58, shown in block form in FIG. 3, is comprised of a magnetic element and associated coil that is mounted in the housing piece 72 in proximity to the teeth of the ring gear 83. Hence, upon rotation of the ring gear 83 and sprocket 53, a pulse signal will be transmitted from the speed sensor 58 through a conductor 129 to the controller 46 so as to provide the speed signal required for its control.

A small cover piece 131 is affixed to a side of the cover 73 by threaded fasteners 132 to protect the various elements and to provide a neat overall assembly.

The housing piece 72 is provided with a plurality of bossed openings 133 that receive fasteners so as to affix the drive assembly to the frame assembly 22 and specifically the bracket 28 thereof.

Figure 12:
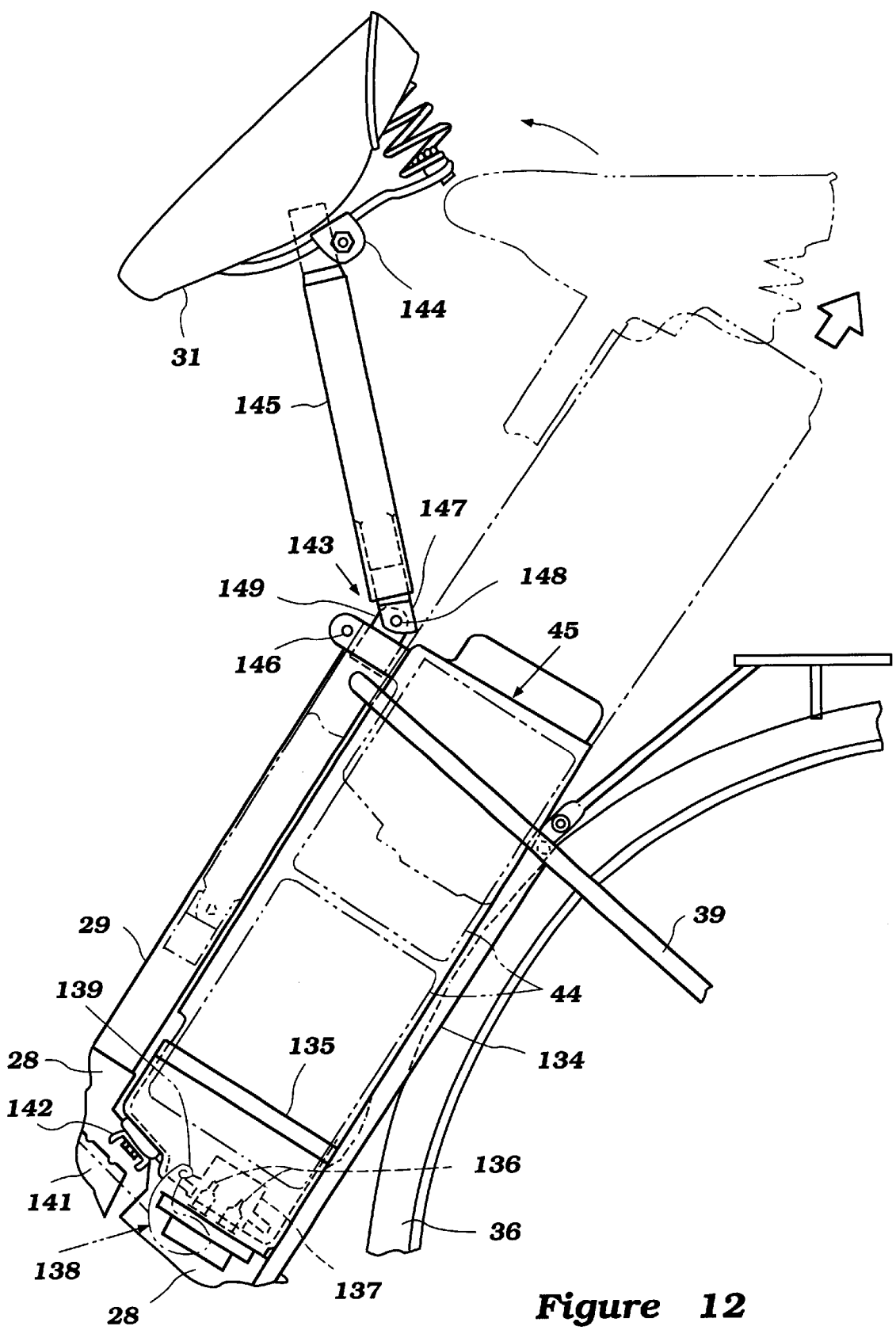
FIG. 12 is an enlarged side elevational view showing the interrelationship between the seat, seat pillar and battery case and shows the seat in an intermediate position and in a battery access position in phantom and solid lines, respectively.

The construction of the battery case 45 and the way in which the seat 31 may be moved to access the batteries 44 will now be described by particular reference to FIG. 12. As has been previously noted, the battery case 45 is positioned to the rear of the seat pillar 29 and is also disposed forwardly relative to the wheel 36. The battery case 45 is relatively narrow and is contained laterally between a pair of auxiliary seat tubes 134 that are connected to and form a part of the frame assembly 22 to the rear of the seat pillar 29.

A battery case socket 135 is fixed relative to the frame assembly 22 and contains a pair of male electrical connectors 136 that are cooperatively engaged with a female socket 137 carried by the battery case 45 when assembled into the socket 135 so as to complete the electrical connection as aforenoted.

A lock mechanism, indicated generally by the reference numeral 138 is provided which has a latching finger 139 that retains the battery case 45 in position and is connected by means of a wire shown schematically at 141 to the main switch 47 so as to be disengaged when a key of the main switch 47 is turned to the lock releasing direction, counter-clockwise as viewed in FIG. 1. Thus, the batteries 44 cannot be removed unless the operator inserts a key in the main switch 47 and rotates it in the aforenoted direction for release purposes.

The battery socket 135 is resiliently mounted on the frame bracket 28 by means of resilient supports 142.

As may be seen in FIG. 1, when the seat 31 is lowered, the battery case 45 is, in major part, precluded from removal or accessing by the seat 31. A seat adjusting and access assembly, indicated generally by the reference numeral 143, is provided for permitting vertical adjustment in the position of the seat 34 and also to permit the seat 34 to be pivoted in a forward direction from the phantom line view as shown in FIG. 12 to an access or service position for removal of the battery case 45 and removal of the batteries 44. This mechanism will now be described by continued reference to FIG. 12 although certain of the components are also shown in FIG. 1.

The seat 31 is affixed by means of a clamping bracket assembly 144 in a known manner to the upper end of a support tube 145. The support tube 145 is slidably supported for movement along an axis defined by the seat pillar tube 29 and is locked in adjusted position by means of a split type clamp 146 in a known manner.

Unlike prior art constructions, however, the tube 145 has a bracket 147 affixed to its lower end which is, in turn, pivotally connected by means of a pivot pin 148 to a somewhat larger bracket 149 which is captured within the seat pillar tube 29. Hence, when the clamping bracket 146 is released, the mechanism may be slid upwardly to the position shown in solid lines in FIG. 12 wherein the member 149 is at the upper end of the seat pillar tube 29. Pivotal movement of the seat 31 and its supporting post 145 about the pivot pin 148 is then possible so as to clear the battery case 45 and permit its removal in a manner which is believed to be obvious from this figure.

It should be readily apparent from the foregoing description that the described construction provides a very compact battery and electric motor assist arrangement for a bicycle that maintains a low and balanced center of gravity relative to the axis of the crank shaft 33 without significantly affected ground clearance. In addition, the battery can be readily accessed but is protected against theft or unwanted intrusion. Of course, the foregoing description is that of a preferred embodiment of the invention and various changes and modifications may be made without departing from the spirit and scope of the invention, as defined by the appended claims.

What is claimed is:

1. An electrically power assisted bicycle comprised of a frame, a front wheel dirigibly supported by said frame, a rear wheel journaled for rotation by said frame, a seat carried by said frame for accommodating a rider, a pedal assembly journaled by said frame for rotation about a transverse crank axis for operation by a rider seated on said seat, a drive coupling said pedal assembly to said rear wheel for manual driving of said rear wheel, an electric power assist mechanism for transmitting a driving force to said rear wheel through said drive and comprised of an electrical motor and a transmission for transferring motive power from said electrical motor to said drive disposed longitudinally entirely on the forward side of said crank axis, said frame comprising a head pipe dirigibly supporting said front wheel and a main frame member extending rearwardly and downwardly toward said crank axis and a seat pillar extending upwardly and rearwardly from a lower end adjacent said crank axis and supporting said seat, said electrical motor and transmission being supported beneath said main frame member and having an output shaft extending generally parallel to and beneath said main frame member, and battery means for providing the only source of electrical power to said electrical motor and disposed longitudinally entirely on the rear side of said crank axis and substantially forwardly of the rotational axis of said rear wheel.

2. The electrically power assisted bicycle of claim 1, wherein the battery means is disposed to the rear of and generally parallel to the seat pillar.

3. The electrically power assisted bicycle of claim 2, wherein the battery means is disposed beneath the seat and further including means for movably supporting said seat for accessing said battery.

4. The electrically power assisted bicycle of claim 3, further including a pair of auxiliary seat tubes disposed to the rear of said seat pillar and to the rear and on opposite sides of the battery means.

5. The electrically power assisted bicycle of claim 3, wherein the seat is supported on the seat pillar by a first portion slidably supported relative to the seat pillar and a second portion also slidably received in the seat pillar and pivotally connected to the first portion for telescopic movement of the first and second portions and pivotal movement of the first portion relative to the second portion.

6. The electrically power assisted bicycle of claim 5, wherein the electrical motor is disposed forwardly of the crank axis and is supported beneath the main frame member and has an output shaft extending generally parallel to and beneath said main frame member.

7. An electrically powered bicycle comprised of a frame assembly, a front wheel dirigibly supported by said frame assembly, a rear wheel journalled for rotation by said frame assembly, said frame assembly being comprised of an upstanding seat pillar carrying a seat at the top thereof for accommodating a rider, an electric motor carried by said frame assembly for powering said rear wheel, and an open topped battery case carried by said frame assembly to the rear of said seat pillar and extending parallel to said seat pillar for accommodating a battery for powering said electric motor, said battery case being disposed beneath said seat and being adapted to receive the battery upon movement thereof in a direction generally parallel to said seat pillar.

8. The electrically powered bicycle of claim 7, wherein the seat is movably supported relative to the seat pillar for accessing the battery case for battery removal.

9. The electrically powered bicycle of claim 8, wherein the seat is supported on the seat pillar by a first portion slidably supported relative to the seat pillar and a second portion also slidably received in the seat pillar and pivotally connected to the first portion for telescopic movement of the first and second portions and pivotal movement of the first portion relative to the second portion.

10. An electrically power assisted bicycle comprised of a frame element comprised of a head pipe, a down pipe extending downwardly and rearwardly from said head pipe and a seat pipe extending generally vertically upwardly from a iuncture with a rear portion of said down pipe, a front wheel dirigibly supported by said head pipe, a rear wheel journaled for rotation by said frame element, a seat carried by said seat pipe for accommodating a rider, a pedal assembly journaled by said frame element for rotation about a transverse crank axis for operation by a rider seated on said seat, said crank axis being contiguous to the juncture of said down pipe and said seat pipe, a drive coupling said pedal assembly to said rear wheel for manual driving of said rear wheel, and an electric power assist mechanism for transmitting a driving force to said rear wheel through said drive and comprised of an electrical motor disposed longitudinally along one of said down and seat pipes and entirely on one side of said crank axis and battery means for providing the only source of electrical power to said electric motor and disposed longitudinally along the other of said down and seat pipes and entirely on the other side of said crank axis, said seat pipe being disposed forwardly of said crank axis and the one of said electrical motor and said battery means that is longitudinally disposed along said seat pipe is disposed to the rear of the seat pipe and between the seat pipe and the rear wheel.

11. An electrically power assisted bicycle comprised of a frame, a front wheel dirigibly supported by said frame, a rear wheel journaled for rotation by said frame, a seat for accommodating a rider, said seat being carried by a seat post of said frame disposed forwardly of a rear fender covering at least in part said rear wheel, a pair of back stays extending rearwardly from said seat post and on opposite sides of said rear fender, a pedal assembly journaled by said frame for rotation about a transverse crank axis for operation by a rider seated on said seat, a drive coupling said pedal assembly to said rear wheel for manual driving of said rear wheel, and an electric power assist mechanism for transmitting a driving force to said rear wheel through said drive and comprised of an electric motor, transmission means for coupling an output shaft of said electric motor to said drive for driving said rear wheel, battery means for providing the only source of electrical power to said electric motor, and means for supporting said battery means in the area longitudinally spaced between said seat post and said rear fender and in the area transversely between said back stays for protection of said battery means.

12. The electrically power assisted bicycle of claim 11 wherein the battery means is disposed in a generally upstanding direction to the rear of the crank axis and beneath the seat and is inserted and removed from the bicycle in directions parallel to the seat post.

13. The electrically power assisted bicycle of claim 11 wherein the battery means is detachably received at least in part within a battery case also positioned in the area between the seat post, the rear fender and the back stays.

14. The electrically power assisted bicycle of claim 13 wherein the battery means has a disconnectable connection to the electric motor through a terminal carried by the battery case.

15. The electrically power assisted bicycle of claim 14 wherein the disconnectable connection between the battery means and the terminal carried by the battery case is automatically connected and disconnected upon insertion and removal of the battery means to and from the battery case.

16. An electrically power assisted bicycle comprised of a frame, a front wheel dirigibly supported by said frame, a rear wheel journaled for rotation by said frame, a seat for accommodating a rider, said seat being carried by said frame, a pedal assembly journaled by said frame for rotation about a transverse crank axis for operation by a rider seated on said seat, a drive coupling said pedal assembly to said rear wheel for manual driving of said rear wheel, and an electric power assist mechanism for transmitting a driving force to said rear wheel through said drive and comprised of an electric motor, transmission means for coupling an output shaft of said electric motor to said drive for driving said rear wheel, a battery case carried by said frame, and battery means detachably supported in said battery case, said battery means having a disconnectable connection to said electric motor through a terminal carried by said battery case, said disconnectable connection between said battery means and said terminal carried by the battery case is automatically connected and disconnected upon insertion and removal of the battery means to and from the battery case.

17. The electrically power assisted of claim 16 wherein the battery case includes an open member having an end wall supporting the terminal and adapted to receive at least an end of the battery means.

* * * * *